United States Patent [19]
Bodine, Jr. et al.

[11] 3,889,152
[45] June 10, 1975

[54] STARTING AND OPERATING BALLAST FOR HIGH PRESSURE SODIUM LAMPS

[75] Inventors: Richard Hill Bodine, Jr., Germantown, Tenn.; Marion Rosiak, Mt. Prospect, Ill.

[73] Assignees: Litton Systems, Inc., Bellwood, Ill.; Bodine Co., Inc., Collierville, Tenn.

[22] Filed: Oct. 10, 1974

[21] Appl. No.: 513,711

[52] U.S. Cl. ............... 315/205; 315/206; 315/208; 315/276; 315/DIG. 2; 315/DIG. 5
[51] Int. Cl. ........................................... H05b 37/00
[58] Field of Search ........ 315/194, 199, 200 R, 205, 315/206, 208, 209 R, 245, 276, 279, DIG. 2, DIG. 5

[56] References Cited
UNITED STATES PATENTS

| | | |
|---|---|---|
| 3,235,769 | 2/1966 | Wattenbach ................... 315/DIG. 2 |
| 3,496,412 | 2/1970 | Taylor et al. ................... 315/DIG. 5 |
| 3,522,475 | 8/1970 | Hashimoto ..................... 315/DIG. 2 |
| 3,679,936 | 7/1972 | Moerkens .......................... 315/205 |
| 3,732,460 | 5/1973 | Wattenbach ................... 315/DIG. 2 |

*Primary Examiner*—R. V. Rolinec
*Assistant Examiner*—E. R. La Roche
*Attorney, Agent, or Firm*—Ronald M. Goldman

[57] ABSTRACT

A ballast for starting and operating a high intensity discharge type lamp is disclosed which incorporates electronic switching elements in one form. The apparatus includes a winding on a magnetic core having at least one tap. A lamp is adapted for connection to the output of the winding and a series circuit of a resistor and a capacitor are connected in parallel of the lamp. A capacitor are connected in parallel of the lamp. A capacitor and a semiconductor control rectifier are connected in series to the tap and diode is connected in shunt of the semiconductor controlled rectifier poled oppositely thereto. A diac is connected to the first capacitor and to the gate electrode of said semiconductor controlled rectifier for triggering the controlled rectifier when the voltage on the capacitor reaches a predetermined level. Suitably the resistor and capacitor circuit is adjusted so that the desired triggering level occurs when the instantaneous AC voltage is at or near a peak level.

7 Claims, 8 Drawing Figures

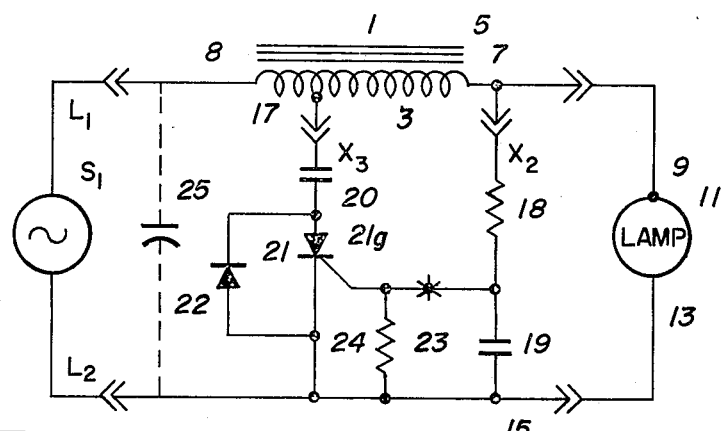
Fig_1
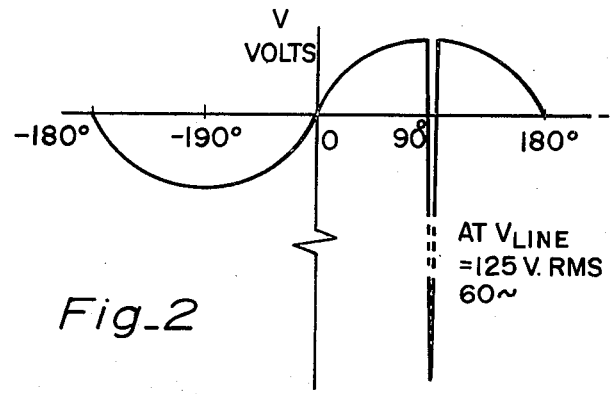
Fig_2
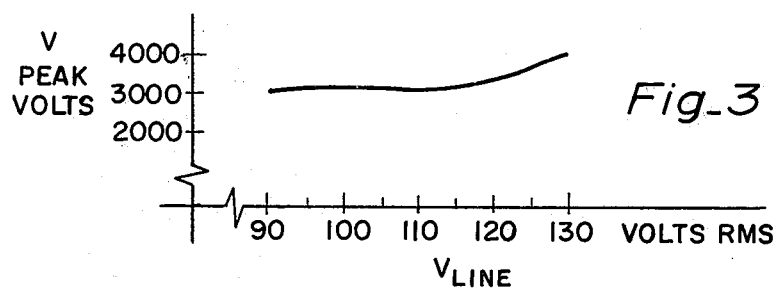
Fig_3
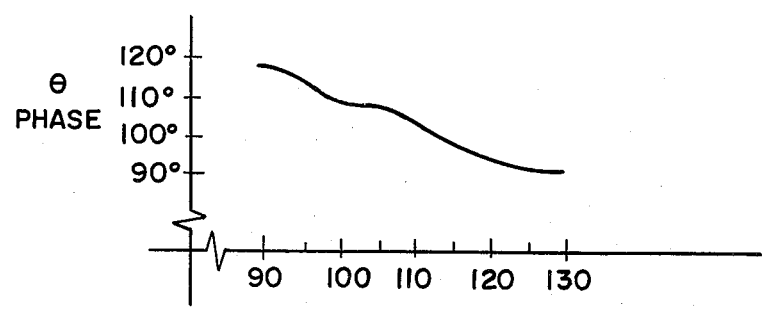
Fig_4

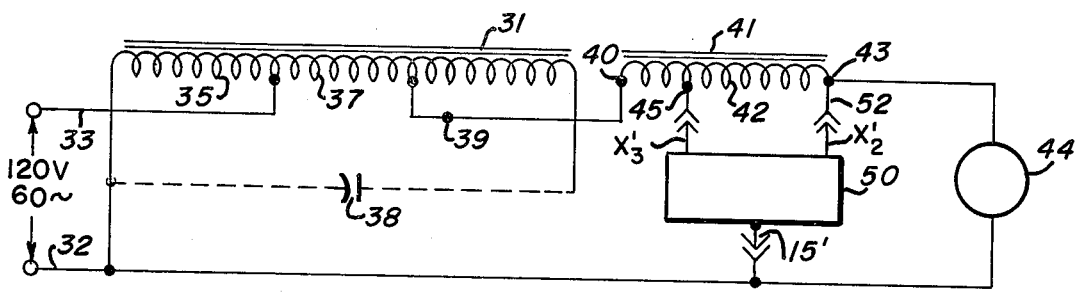
Fig.5
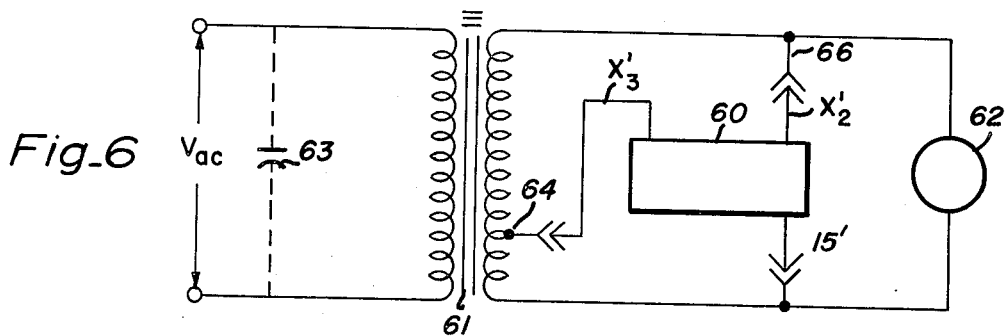
Fig.6
Fig.7
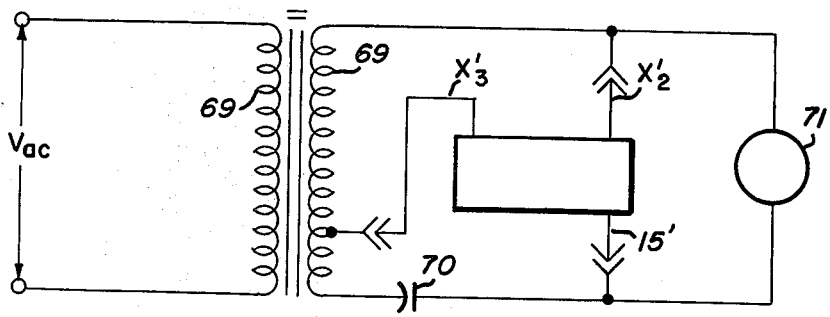
Fig.8
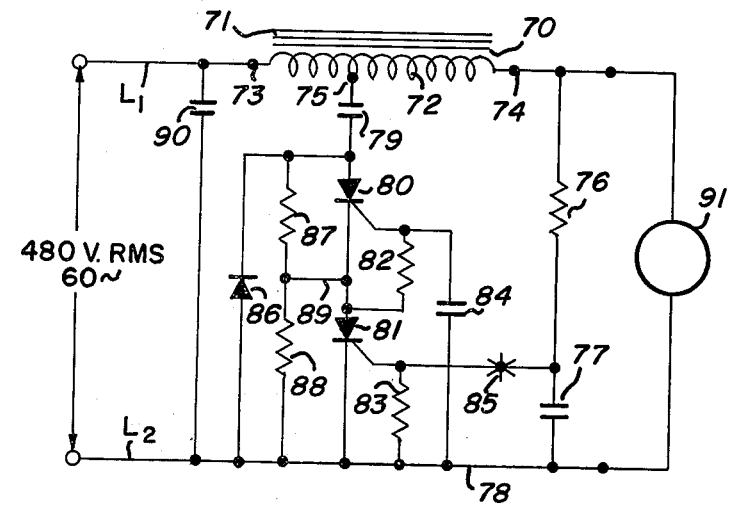

STARTING AND OPERATING BALLAST FOR HIGH PRESSURE SODIUM LAMPS

This invention relates to apparatus for starting and operating high intensity arc discharge lamps, and more particularly, to an improved ballast apparatus for starting and operating those types of arc discharge lamps which require a starting voltage that is on the order of ten times larger than the normal operating voltage for the lamp.

Mercury lamps, sodium vapor lamps, and the new metal halide lamps are typical of the family of gaseous or arc discharge devices having a gas confined in a glass envelope which produce illumination in response to electrical current through the ionized gas contained within the glass envelope. To effect such a light producing discharge the confined gas must be initially ionized. That initial ionization is brought about by the application of a high ionizing voltage applied across the lamp terminals for a predetermined period of time. Once ionized, however, the voltage required to operate the lamp and maintain such ionization is less than that aforedescribed voltage required to start the lamp. For this reason a high open circuit voltage must be applied to the gas discharge lamp device for starting, and this voltage is substantially higher than the operating voltage and usually higher than the available line voltage. Another characteristic of arc discharge devices is that they have a negative resistance characteristic and, more particularly, when operating their equivalent electrical resistance decreases with the applied voltage over a range and as a result an electrical impedance means is generally required in the power supply circuit of these lamp devices for limiting the current flow to below a predetermined desired value. With such electrical characteristics, the arc discharge lamp devices are generally provided with starting and operating circuits in the power supply which provides the relatively high open circuit voltage, the lower operating voltage, and the series electrical impedance means for current limitation. One well known apparatus which accomplishes the foregoing purpose for various mercury type lamps include a ballast transformer and a series capacitor or a reactor, adequately described in past publications. This apparatus applied to power a mercury lamp provides a starting voltage which is on the order of twice the operating voltage of the mercury lamp, as is familiar to those skilled in the art, and that apparatus is economically feasible to manufacture. However in the case of the high pressure lamps, such as the metallic helide or sodium vapor lamps, the pressurization of the combined gases is so high in comparison to the pressurization in the mercury type lamp that larger starting peak voltages, on the order of double the operating voltage in the case of metal halide type lamps and on the order of 10 times the operating voltages in the case of high pressure sodium vapor type lamps, are required to start the gaseous discharge in the lamp. To accomplish this dynamic range of voltages with a simple ballast transformer, reactor, or ballast transformer and capacitor combination is uneconomical and in some cases may be technically unfeasible.

To meet starting and operating requirements for such high pressure gas discharge lamps economically various electronic circuits have in the past been proposed and used in combination with ballast of either the transformer type or the reactor type to generate the high voltages for starting the lamp. As a general principle, these electronic devices operate on the known principle of charging a capacitor with a voltage and thereupon by means of an electronic switch discharging the capacitor through a winding or a portion of a winding associated with or coupled with the ballast transformer as in the case of the automobile ignition, etc. Through known transformer action the currents may be used to generate a high voltage in a second winding or second winding portion, and through the latter winding the high voltage is applied across the lamp to furnish the requisite starting voltage. Some such types of devices and combinations for starting and operating an arc discharge device which are believed representative are shown in Attewell, U.S. Pat. No. 3,407,334, Moerkins, U.S. Pat. No. 3,679,936, and Bell, U.S. Pat. No. 3,374,396.

While some of such prior art lamp starting and operating apparatus are commercially available, they are regarded by Applicants as having extrinsic drawbacks of one type or another. Reference is made to the circuit disclosed in U.S. Pat. No. 3,407,334 to Attewell and assigned to the McGraw Edison Company. The disclosed apparatus in Attewell presents a circuit that appears to be the ultimate in simplicity and minimization of components which suggests the apparatus to be very desirable. Unfortunately that apparatus requires a diac having such particular characteristics that the diac is economically unavailable. Thus although from the standpoint of simplicity, the circuit apparatus appears to be desirable, from the standpoint of practicality and economics the circuit is not useful and the public cannot obtain its benefit if the cost is so high that few can afford to buy it. As a consequence it is known that the assignee of the above-identified patent manufactures and sells an apparatus for the same purpose which contains a much more complicated electronic circuit, including two capacitors, four resistors, a diac, a diode and a silicon controlled rectifier connected apparently in a different manner than that disclosed in the Attewell patent to be used for starting lamps. In that commercially available circuit a series consisting of the charging capacitor and a resistor is connected across the lamp and electrical current thus flows through that series circuit to be dissipated in the resistor regardless of whether the lamp is operating or inoperative.

Inasmuch as the resistor in the foregoing apparatus must dissipate electrical current in the form of heat, for large wattage lamps the resistor must be very large in wattage capacity. That in turn requires the resistor to be of a very large physical size and is more expensive, and means must be considered in the overall ballast apparatus to take into account the removal of the resultant undersired additional heat. Secondly the apparatus does not operate at all voltage ranges. Where the AC line voltage is on the order of 120 volts RMS the design appears incapable of operating with a reactor type ballast. In order to store electrical charge at the lower voltage sufficient in quantity to generate a requisite high voltage pulse, the capacitance size of the capacitor, i.e., its farad rating, theoretically must be increased. In so increasing the capacitor size, the impedance thereacross, which is inversely related to the capacitance, is reduced. This impedance is in shunt of the lamp and its reduction attenuates and reduces the high voltage pulse generated theoretically in the reactor winding, which defeats the purpose of increasing the size of the capacitor.

In the circuit of Moerkins, a starting and operating device is illustrated which for lamp starting generates a plurality of pulses during the AC half cycle. This results in generation of high frequency energy that may cause interference with other types of devices. In his basic circuit Moerkins employs a Zener diode to trigger a semiconductor switch which in turn discharges and charges a capacitor, which current directly or indirectly generates the high voltage pulse or pulses in a critically underdamped circuit. The Zener diode is responsive to the level of voltage across the semiconductor switch and conducts current at the desired level. If, for example, the circuit were to be used in a 220-volt RMS system, the Zener diode would require a breakdown voltage of about 500 volts. Such a characteristic in a Zener diode makes it very expensive and difficult to obtain. As is somewhat understood from the Moerkins specification, to limit the generation of pulses to one per AC half cycle, Moerkins appears to employ a complicated scheme which requires many additional components that appear cumbersome and present additional expense. In the one example disclosed by Moerkins, one transformer is added and the full current of the discharge lamp is carried through the primary winding. Hence the winding must be large and the unit is bulky. Still another scheme for generating electronically the high voltage pulses in lamp ballast apparatus is that illustrated in the Bell et al patent, U.S. Pat. No. 3,374,396. In this arrangement a separate transformer winding is provided for the pulse generating circuit and it appears that only the discharge current of a capacitor is employed, much like the Attewell circuit discussed, a neon lamp is employed in the triggering circuit which is more subject to change in characteristic than a semiconductor diac. As is apparent upon consideration of Bell, a large number of components are employed which result in higher cost and a large sized unit.

In addition to the aforediscussed, other factors of operation encountered in practice is that with some circuits the magnitude of the peak pulse produced or its position in time changes undesirably as a result of a not infrequent change in AC line voltage supplied by the electric utility company and to cure this other complications and components may be added. Other designs may provide high voltage starting pulses unnecessarily even after the lamp is operating. While no survey or inspection of circuits has been undertaken by applicants, it is worthwhile to inspect the prior art designs from a technical standpoint with the aforementioned undesired consequences in mind.

SUMMARY OF THE INVENTION

Accordingly it is an object of the present invention to provide a starting and operating circuit requiring a minimum of electrical components, that utilizes inexpensive and readily available components, that avoids unnecesary energy consumption and heat generation so that the components are of a minimum size physically and eliminates the need to account for undesired heat; and further to provide a circuit which is of more universal application for operation with different ballast transformers or reactors of different voltage ratings without necessary change in circuit arrangement or component value allowing for economy of manufacture; and to provide a lamp operating unit which produces essentially only one peak high voltage pulse per alternate half cycle at a predesired phase position in the AC half cycle that remains relatively constant and in phase position essentially independent of the line voltage variation; and to provide a circuit arrangement which avoids placing a large capacitive load across the lamp as might load down the high voltage pulse so as to maintain the highest possible pulse voltage; and to provide a circuit which terminates the generation of high voltage pulses once the lamp has commenced to conduct current.

In the invention at least one winding of a reactor or transformer is connected in an electrical series circuit with a high pressure arc discharge lamp. The winding includes a tap located a minor number of turns from a winding and a resistor and a capacitor are connected electrically in series and this series circuit is connected between the end of the winding most proximate the lamp and a common to which one terminal of the lamp is connected. A diac, a voltage responsive switch, and a resistor are connected in series and this series circuit is connected across the capacitor so that the diac conducts current only when the voltage on the capacitor has reached a predetermined level. A second capacitor is connected in electrical series circuit with a silicon-controlled rectifier, SCR, between the tap on the aforecited winding and the circuit common to which one end of the lamp is attached and the SCR is poled electrically in one direction with its anode connected to the second capacitor. A diode is connected electrically in circuit across the silicon-controlled rectifier and oppositely poled with respect thereto. The juncture of the resistor and diac is connected in circuit to the gate electrode of the silicon-controlled rectifier. An aspect of the invention is the value of the resistor in the first mentioned series connected resistor and capacitor combination, between 68 kiloohms and 350 kiloohms, and the product of the resistance in ohms and the capacitance in farads, the "RC" factor of the circuit, expressed in seconds, is chosen to produce a signal at the gate of the semiconductor controlled rectifier very near the peak of the input AC sine wave.

In the operation of the invention during one AC half cycle, current passes through the diode to charge the second capacitor up to line voltage. On the other half cycle of AC input the voltage across the capacitor is twice that of the supply voltage when the SCR is turned on. The charge time for this to occur is relatively short in comparison to the 60 cycle. Concurrently the voltage across the lamp is monitored and when the instantaneous voltage during an AC half cycle reaches a set level, the diac switches and conducts current resulting in a proper polarity pulse to the gate of the SCR. The SCR thereupon conducts current to rapidly discharge the capacitor through a portion of the aforecited winding. Through transformer action a very high voltage pulse is generated across the remainder of the winding and is applied across the lamp. Once the lamp has operated the impedance of the ballast transformer limits current to the lamp in the conventional manner and the voltage appearing across the lamp is of a reduced level. At this reduced level the voltage upon capacitor C2 never attains a level sufficient to cause the diac to conduct and thereupon the controlled rectifier does not fire. The second capacitor simply charges to its proper level on one AC half cycle and thereupon ceases to conduct current. By making the resistor in the voltage monitoring circuit of a very high value, very little current is dissipated during the time that the lamp is in operation and hence very little excess heat is generated. The circuit maintains a high impedance in parallel with the lamp that produces only negligible attenuation of the high voltage pulse generated in the winding. Similarly no additional voltage pulses or current paths exist which can consume current or result in the generation of unnecessary voltage pulses.

The foregoing objects and advantages of the invention and the structure characteristic of the invention are better understood from a consideration of the detailed description of the preferred embodiments of the invention, which follows, taken together with the figures of the drawings.

BRIEF DESCRIPTION OF THE DRAWINGS

In the drawings:

FIG. 1 illustrates one embodiment of my invention;

FIG. 2 illustrates the voltage applied to start the lamp in one practical embodiment;

FIGS. 3 and 4 illustrate the change in peak pulse voltage and pulse position respectively as a function of line voltage;

FIG. 5 illustrates a second embodiment of the starting and operating circuit of my invention; and FIGS. 6 through 8 illustrate other combinations of the ballast transformers of various types with the electronic starting circuit disclosed in FIG. 1.

DESCRIPTION OF THE PREFERRED EMBODIMENTS

The embodiment of FIG. 1, as represented schematically, includes a conventional reactor type ballast, 1, having a winding, 3, which includes a number of turns, N, of insulated electrical wire. The winding is located on an iron core 5 which is of a conventional structure. The right end 7 of the winding as appears in the figure is connected to one of the terminals 9 of a high intensity discharge type lamp, suitably a sodium vapor lamp, and the other end 8 of winding 3 is connected via line L1 to one end of an AC source, S1, which, by way of example, may be 120-volt RMS 60-cycle AC. The other terminal 13 of lamp 11 is connected to the line 15, which serves as an electrical common or neutral point in the circuit. Line 15 is in turn connected via line L2 to the other terminal of source S1. Source S1 is obviously symbolic of the AC voltage supplied by the utility company and which is made available at an outlet receptacle or connection box. As is apparent, an electrical series circuit is formed from the source S1, the winding 3 and lamp 11, line 15, and back to the source.

The ballast reactor, 1, is conventionally designed to provide the proper current limitation by presenting a predetermined electrical impedance, particularly an inductive reactance, in series with the lamp during lamp operation.

A tap 17 is located on the winding at a predetermined number of turns, $N_T$, away from the winding end 8 and divides the winding into two protions. The number of turns $N_T$ is substantially less than the number of turns N in the winding or in the turns remaining in the other portion of the winding, $(N-N_T)$, so as to provide a transformation or turns ratio between the two winding portions, $(N-N_T)/N_T$, of any desired ratio, typically of at least ten to one.

A resistor 18 is connected to the right hand end of winding 3 to a capacitor 19 and capacitor 19 is connected to the common line 15 so as to form an electrical series circuit which, essentially, is in shunt of, across the, or in parallel with, as variously termed, lamp 11. A second capacitor 20 has one end connected to tap 17 and its other end connected to the anode terminal, positive polarity, of a semiconductor controlled rectifier 21. The cathode or negative polarity terminal of the silicon or semiconductor controlled rectifier, abbreviated sometimes as SCR, is connected to a circuit common or common line 15, which serves as a point of reference zero potential or voltage.

The semiconductor controlled rectifier is a well-known device having an anode, a cathode, and a gate electrode, and which in operation is normally in an electrically non-conductive state and which is switched into its electrically conductive state by application of a proper trigger voltage to its gate electrode. When so triggered the SCR conducts electrical current only in a direction from its anode to its cathode, the positive polarity of the current source appearing at its anode and continues to conduct such current, irrespective of any voltage at the gate electrode, until the current ceases or reduces to zero, at which time the SCR reverts to its nonconductive state and must be retriggered in order to again conduct.

A diode rectifier 22, which can conduct current only in a direction from its positive to negative polarity terminal, is electrically connected in shunt of the SCR 21 and is poled oppositely to that of the SCR so that the cathode or negative polarity end of diode 22 is connected to the anode end of SCR 21 and the anode end of diode 22 is connected in common with the cathode end of SCR 21. A diac 23, a familiar voltage responsive semiconductor switch, which is in an electrically non-conducting state until a voltage sufficient to cause breakdown is applied across its terminals, is connected in circuit between resistor 18 and capacitor 19 in series with a resistor 24 and resistor 24 in turn is connected to line 15. The gate electrode 21g of SCR 21 represented in the figure is connected to the circuit between diac 23 and resistor 24. As hereinafter described, an additional capacitor 25 may be added, as indicated by the dash lines, connected between winding end 8 and line 15.

As is known, alternating current, abbreviated as AC, reverses in polarity from positive to negative periodically, with respect to a reference zero voltage, such as 120 times per second for 60 cycle AC. Thus the voltage at line L1 will appear positive then negative during each full cycle of AC while that at L2 appears negative then positive over a full cycle. In making reference to a half cycle of AC, reference is being made to either the positive or the negative half of the full cycle as described in the test with respect to the common line 15 arbitrarily considered as at a reference zero voltage.

AC voltage is applied to the winding to provide an AC voltage at tap 17 and winding end 7. Assuming during operation that the voltage on L1 is on the negative AC half cycle and that on L2 positive, electrical current flows, by convention from positive to negative, in a path from source S1, line L2, through rectifier diode 22, capacitor 20, tap 17, the winding portion of reactor 1, line L1, to the other terminal of source S1. This current charges capacitor 20 to the level of voltage at tap 17, which is the peak line voltage, in a very short period of time less than the half cycle period, T seconds, of the AC with the positive polarity of that voltage applied at the anode of the SCR. As the polarity of source S1 reverses and line L1 becomes positive in polarity relative to line L2, diode 22 blocks discharge of capacitor 20 since the diode can only conduct current in a direction from its anode to cathode, and the voltage on L1 is additive with the voltage across capacitor 20. The voltage across the combination of capacitor 20 and SCR 21 builds up during this half cycle to twice the peak voltage of the source. Concurrently, the voltage at the right end 7 of winding 3 is sinusoidally increasing to a peak value and current through resistor 18 charges capacitor 19 so that the voltage across capacitor 19 likewise is increasing. At a predetermined level of voltage across capacitor 19, the voltage responsive semiconductor switching diode diac 23 switches into its current conducting condition and conducts current both through resistor R1 and, being of the requisite positive polarity, through the gate 21g of SCR 21. The value of resistor 18, capacitor 19 and the voltage is selected so that the timing during the AC half cycle when diac 23 conducts is such that the silicon controlled rectifier is thereby triggered into its current conducting conditions at a time during the half cycle of AC when the voltage across the combination of capacitor 20 and SCR 21 is aproximately twice the supply voltage as previously described. Once triggered, the SCR conducts current until the current between its anode and cathode reduces to zero, and then the SCR restores to its nonconducting condition pending a new triggering pulse at its gate.

With the SCR switches into its conducting state a large current flows in the circuit from the source, line L1, the small winding portion of turns $N_T$, the tap 17, capacitor 20 and SCR 21 over lines 15 and L2, back to the source to discharge capacitor 20 and recharge the capacitor to a voltage of the opposite polarity. When recharged during this AC half cycle, the current reduces to zero and SCR 21 restores to its nonconductive state. It is noted that even if another trigger voltage is reapplied at the gate electrode of SCR 21 during this same half cycle, the SCR does not conduct current since the voltage on capacitor 20 is of the reverse polarity or negative polarity and the SCR cannot conduct current in that direction.

In passing through the few turns of the small winding portion, the current generates a magnetic field in magnetic core 5 which through well known transformer type action induces a large voltage pulse across the remaining winding portion. Typically this voltage is on the order of the turns ratio, $N-N_T/N_T$, multiplied by the voltage across the short winding portion. This pulse is superimposed upon the sinusoidal open circuit voltage existing at that moment of time as appears at winding end 7 and the pulse is applied across the lamp in series with the voltage of source S1.

On the alternate half cycles gradual current through diode 22 discharges capacitor 20 and recharges the capacitor with a voltage of the original polarity. This current also flows through the small winding portion but that does not generate a voltage as observed.

During the alternate half cycles, capacitor 19 is discharged also in preparation for the next positive half cycle.

The high voltage pulses continue to be generated in the aforedescribed manner during alternate ones of the AC half cycles until the lamp 11 ignites. When the lamp ignites and conducts current, the RMS voltage at winding end 7 drops in level substantially to the normal operating voltage of the lamp. Thus after the lamp ignites, the voltage applied to the series circuit of resistor 18 and capacitor 19 is reduced and the resistor 18 prevents capacitor 19 from attaining the level during the half cycle necessary to switch diac 23 into its current conducting state, and no further trigger pulses are applied to gate 21g of SCR 21. Capacitor 20 thereupon charges to the peak voltage on the first half cycle in which line L2 is positive with respect to line L1 and thereafter draws no further current.

As disclosed in the foregoing figure, the high capacity charging capacitor 20 is not located at the lamp end of reactor 1. This avoids a circuit location wherein the capacitor could serve to capacitively absorb or "load down" a high voltage pulse. Moreover the charge-discharge-charge cycle of the capacitor in the foregoing emobodiment is that it is placed toward the input end of the reactor and is given an initial charge opposite in polarity to that which it will have on the half cycle during which the pulse is desirably generated. If the timing capacitor fires SCR 21 during the next half cycle, a voltage equal to twice the line voltage is impressed across this capacitor. The charging current flowing into the capacitor produces a high voltage pulse which appears across the lamp. If the SCR does not fire the capacitor holds its charge and draws no more current form the circuit thus eliminating any wasted energy. In practice locating the capacitor at the input end of the ballast reactor eliminates the pulse attenuation otherwise occurring and results in a practical circuit that can generate the desired high voltage pulses from 120 volt lines.

By adding a capacitor 25 any impedance in the lines to the source S1 does not limit the discharge current through capacitor 20 inasmuch as the current will go through capacitor 25, which is charged to the source voltage in shunt of that impedance.

In one practical example the ballast reactor was designed to operate a 150-watt high pressure sodium vapor lamp manufactured by the General Electric Company, Model No. LU-150/BU, having a nominal arc voltage of 55 volts. Normal operating voltage of the lamp is 120 volts and its minimum starting peak voltage is 2,500 volts. The line voltage is 120-volts RMS. The winding comprised 308 turns of No. Seventeen insulated wire and the tap was located 280 turns from the lamp end 7, resulting in a transformation ratio of 280/28 or 10 to 1. The reactor further comprised a 1⅜ths inch stack of E-I magnetic steel laminations having an air gap in the center leg of 0.095 inches and the winding was located on the center leg. Resistor 18 had a value of 82,000 ohms, one-half watt rating, capacitor 19 had a value of 0.1 microfarads, resistor 24 had a value of 560 ohms, one-half watt rating, diac D2 was of the type ST-2, SCR 21 was the type S4003L, capacitor 20 had a value of 0.068 microfarads, and diode D1 was of the type IN 4005, manufactured by Semicon Company. As is appreciated, these components are of standard ± 10 percent tolerance and of standard value so as to be inexpensive and easily obtainable.

In this specific embodiment the high voltage pulses had a peak value of 4,000 volts as measured between lead $X_2$ and the common line. This pulse occurred at a position of $\pi/2$ radius or 90° during the half cycle of AC applied to the reactor input and the pulse configuration as viewed on an oscilloscope is illustrated in FIG. 2. In that figure, curve B illustrates the voltage at winding end 7 of FIG. 1. It is seen that the large voltage pulse B is generated when SCR 21 conducts current.

During operation of the lamp, the power consumed by resistor 18 was only 0.15 watts.

FIG. 3 illustrates the change in peak pulse voltage generated in the unit as the AC line voltage (RMS) varies between 90 and 130 volts. From this figure it may be observed that during normal line voltage variations the pulse height remains between 2,500 volts, the minimum peak starting voltage specified by the lamp manufacturer, and 4,000 volts, the maximum peak recommended by the lamp manufacturer.

FIG. 4 illustrates the angular position expressed in degrees within the positive AC half cycle in which the high voltage pulse is generated in the specific embodiment as a function of the AC line voltage. It is seen that as the line voltage varies between 90 volts and 130 volts RMS the pulse position varies between 90 and 119°.

This is important in that if resistance values and capacitance values of resistor 18 and capacitor 19 are off by ± 10 percent, the normal commercial tolerance, the SCR is still switched into its current conducting condition at a time during the AC half cycle to generate sufficient high voltage.

It is apparent that resistor 18 and capacitor 19 can be adjusted or changed in value to place the pulse at any angular position.

The starting circuit of FIG. 1 may be employed in combination with other conventional lamp ballast apparatus modified in accordance with the invention such as is schematically and symbolically illustrated in FIG. 5, Thus an auto-transformer includes on a magnetic core a primary winding 35 which couples AC voltage into a secondary winding 37, and, as indicated by the dash lines, a capacitor 38 may be connected between an end of the secondary across the windings. A tap 39 couples secondary winding 37 to one end 40 of the winding 42 and iron cored reactor 41, schematically illustrated. The other end 43 of the reactor winding is connected to one terminal of HID lamp 44, such as a sodium vapor lamp, and the other lamp terminal is connected to the common line 32. The reactor winding 42 has a tap 45 located some small number of turns from winding end 40, and may be essentially of the same type of reactor construction described in connection with the preferred embodiment of FIG. 1.

The electronic circuit portion of the circuit employed in FIG. 1 is symbolically illustrated by the block 50. For convenience the symbols and numerals which designate the electrical leads of this circuit in the embodiment of FIG. 1 are used in connection with FIG. 2 and thereafter. The common line 15' of the electronic circuit is connected to one side of the lamp, the voltage monitoring lead X2' connected to winding end 43 of the reactor and the charging capacitor connected via lead X3' to tap 45 on the reactor winding.

It is noted that the auto-transformer may be of the type in which the tap 39 is instead the end of the secondary winding 37. However as is illustrated in this preferred construction, a capacitor 38 may be connected as shown for either power factor correction or to place the secondary winding 37 into ferroresonance dependent upon the value of the capacitor and the leakage reactance of the transformer so as to produce an AC output voltage at tap 39 that is relatively constant and hence substantially independent of the line voltage variations of the 120-volt source applied across lines 32 and 33. In other respects the operation of the starting circuit in conjunction with the reactor auto-transformer may be considered the same as in the operation of FIG. 1 by considering the output at tap 39 to be in input AC voltage in FIG. 1. If the AC voltage applied at winding end 40 of the reactor is the same as that employed in the practical embodiment of FIG. 1, then the same value for resistance capacitance, etc. may be used in this circuit. Similarly as illustrated schematically in FIG. 6, the starting circuit 50 may be used in conjunction with a conventional high reactance transformer 61 of the type having an isolated primary and a secondary winding on a magnetic core in which the primary couples AC voltage into the secondary. A capacitor 63 may be applied for power factor correction across the transformer primary. The secondary of the transformer includes a tap 64 located a predetermined number of turns from the end, and this tap is connected via lead X3' to the capacitor, not illustrated, in circuit 50. The voltage monitoring connection is made via lead X2' to the high voltage output end of the transformer secondary and the common is connected via lead 15' to the other end of the secondary. In this the voltage monitoring arrangement in the starting circuit consisting of the series resistor and capacitor in FIG. 1 is placed directly across or in shunt of lamp 62. Where the open circuit voltage at end 66 is greater than 120-volts of the earlier example, the resistor in the monitoring circuit must be changed in value.

A similar arrangement is illustrated in FIG. 7 in conjunction with a transformer 68 having a magnetic core on which is mounted a primary winding for coupling AC voltage, a secondary 69 which secondary is connected in series with a capacitor 70 and lamp 71 in a conventional constant wattage arrangement. In a constant wattage operating circuit the capacitive reactance of capacitor 70 is greater than the inductive reactance of the leakage reactance of the transformer 68 so as to cause a leading current to flow in the transformer secondary and cause saturation of the secondary core portion thereof during operation so that the output current to the lamp remains relatively constant independent of line voltage variations applied to the primary winding. In this structure the voltage monitoring lead X2 and common lead 15' are connected across lamp 71 to place the monitoring circuit in shunt of lamp 71. And one end of the transformer secondary winding is coupled to the circuit common through or by means of series connected capacitor 70. In other respects the operation of the starting circuit symbolically illustrated is the same as described in connection with the preferred embodiment of FIG. 1.

It is noted that where each of these transformers is employed to provide power to a 150-watt HID lamp, as in the specific example previously given in connection with the description of FIG. 1, the same specific components in the starting circuit may be similarly employed in each of these other circuits and the only variable is the selection of the appropriate location for the tap in the secondary winding.

In FIG. 8 we illustrate a modification of the novel starting circuit which provides suitable starting pulses in combination with a reactor type ballast to a sodium vapor high intensity discharge type lamp when the AC line voltage supplied is 480-volts RMS 60-cycles. A reactor 70 having an iron core 71, a winding 72 having an input end 73, an output end 74 and a tap 75. A resistor 76 is connected in series with capacitor 77 between output end 74 of reactor 70 and a common line 78. A second capacitor 79 is connected between the tap 75 and the anode of a first silicon controlled rectifier 80. The cathode of SCR 80 is connected to the anode of a second silicon controlled rectifier 81 and the cathode of SCR 81 is connected to the common line 78 to form a series electrical circuit. A first resistor 82 is connected between the gate electrode of SCR 80 and in circuit with the anode of SCR 81. A second resistor 83 is connected between the gate electrode of SCR 81 and the cathode thereof. A capacitor 84 is connected between the gate electrode of SCR 80 and common line 78. A diac 85 is connected in circuit between resistor 76 and capacitor 77 to the gate electrode of SCR 81. Additionally a diode rectifier 86 is connected between the anode of SCR 80 and common line 78 with the diode having its anode connected to the common line 78 so as to be poled electrically oppositely to the polarity of the silicon controlled rectifiers 80 and 81 in the circuit. A pair of series connected resistors 87 and 88 are connected across the diode and the midpoint of the cited series resistor circuit is connected in circuit in between the anode of SCR 79 and the cathode of SCR 78 via lead 89. Additionally a capacitor 90 may be connected between common line 78 and input end 73 of the reactor winding. The output end 74 of the reactor winding is connected to one terminal of lamp 91, suitably a high intensity discharge lamp such as sodium vapor, and the remaining terminal of the lamp is connected to common line 78 to form an electrical series circuit including reactor 70 and lamp 91 and the AC source.

The reactor is of the proper design to have an inductance characteristic for the particular lamp operating current desired so as to limit the current flow in the series circuit to the proper value during the normal operation of lamp 90. During the half cycle that the voltage at L1 is negative with respect to line L2, diode 86 charges capacitor 79 to the peak line voltage and accordingly raises the anode of SCR 80 to that voltage level. During the next half cycle of the input voltage, line L1 goes positive with respect to line L2, the voltage of the line is added to the voltage on capacitor 79, so that the voltage between line 78 and the anode of SCR 8 raises to a level approaching twice the peak line voltage. Resistor 76 and capacitor 77 form the timing circuit for triggering the operation of the silicon controlled rectifiers at the appropriate moment during this AC half cycle as in the case of the embodiment of FIG. 1. At the appropriate time in this half cycle the voltage on capacitor 77 reaches a predetermined value, the voltage responsive diac 85 switches on and conducts current through resistor 83 and the gate electrode of SCR 81. SCR 81 thereupon switches into its current conducting condition placing the cathode of SCR 80 at essentially the common potential of line 78. This biases the gate electrode of SCR 80 for conducting and creating a current conducting path for capacitor 84 to discharge through the gate electrode. Thereupon SCR 80 switches into its current conducting condition almost simultaneously with SCR 81. Accordingly the line voltage is placed across capacitor 79 causing it to rapidly discharge and then to recharge to the new line voltage. In so doing, the capacitor current flows in a path which includes the input end 73 of reactor winding through the winding portion and out tap 73. By transformer action as in the case of the circuit of FIG. 1, the high current pulse induces a high voltage pulse in the remaining portion of the reactor winding and this pulse appears at 74 and is thereby applied to lamp 91 to start the lamp. Once the lamp 91 is started the voltage at end 74 of the reactor drops to a lower level. Consequently thereafter the voltage which appears at capacitor 77 never attains the predetermined level necessary to cause diac 85 to conduct and hence the silicon controlled rectifiers do not thereafter conduct current and hence pulses are no longer generated once lamp 91 is operating.

During the first succeeding half cycle of AC in which line 78 is positive in polarity with respect to line L1, capacitor 79 charges up to the peak line voltage via diode 86 and reactor winding portion. When the polarity of the lines reverses so that L2 is negative, diode 84 prevents current from passing in the reverse direction and the capacitor can only discharge slowly through resistors 87 and 89. Since resistors 87 and 89 are very large in value, very little discharge current results and capacitor 79 retains substantially its full charge over the half cycle. As was noted in the case of FIG. 1, a slight current continues to pass through the series circuit consisting of resistor 74 and capacitor 75. However, inasmuch as 74 is of very high resistance the current which flows is minimal and hence the $I^2R$ power loss dissipated in resistor 74 is minimal and the heat generated thereby is also negligible which allows for a physically more compact unit and avoids any necessary design structures which would be required were the circuit to dissipate large amounts of heat.

As is apparent from the preceding description of the various embodiments of the invention, the electronic circuitry functions with the inductive winding forming part of the ballast so as to use the AC voltages which appear in the winding in any one of the various illustrated ways to generate the high peak voltages required for starting the high pressure sodium vapor lamp. As is illustrated in FIGS. 1 and 8, the AC line voltage is applied directly to one winding end and provides an AC voltage with reference to the circuit common at each of the tap and the other winding end. In the embodiments of FIGS. 6 and 7 the AC voltages are provided in the secondary winding of a transformer appearing at least at the tap and at one winding end which is obtained by coupling the AC voltage applied to the transformer primary winding into the secondary winding through transformer action, i.e., electromagnetic induction. In the case of FIG. 5, which combines both the features of an autotransformer and a reactor into a single ballast arrangement, the voltage is applied to one end of the winding as the voltage induced in the secondary of an auto type transformer from the primary winding. It is apparent that in some respects the electronic circuitry can be considered apart as a convenient attachment to any preexisting ballast having an appropriate tap. Thus in the case of any ballast unit with a winding tap one finds at least three extending electrical leads, one of which is connected to a tap in the winding of an inductive device comprising part of that ballast and the other two of which are adapted for connection to the opposite terminals of a gaseous discharge lamp. This is true even in the case of FIG. 7 in which a capacitor is connected in series with the secondary winding as part of the lamp operating ballast.

The foregoing description of the embodiments of the invention clearly suffices to teach one skilled in the art

What is claimed is:

1. Means for starting and operating an arc discharge lamp comprising:
inductive ballast means, said ballast means containing a magnetic core and at least a first winding of N turns of insulated wire mounted on said core;
tap means on said winding at a position approximately $N_T$ turns from said first end of said winding, wherein $N-N_T/N_T$ is a quantity greater than 1;
a circuit common;
means for connecting said lamp means in an electrical series circuit between an end of said winding and said circuit common;
means for monitoring the instantaneous voltage across said first winding, said means comprising:
first resistor;
first capacitor; means connecting said first resistor and first capacitor means in electrical series circuit between said winding end and said circuit common;
second capacitor means;
first and second semiconductor controlled rectifier means, each of said rectifier means containing an anode, a cathode and a gate electrode;
means connecting the anode of one controlled rectifier means to the cathode of the other controlled rectifier means to form a series circuit and means connecting said second capacitor means in series with said aforementioned series circuit between said tap and said circuit common;
diode rectifier means, said diode rectifier means being connected in shunt of said series circuit of said controlled rectifier means and in opposite polarity thereto;
second and third resistor means connected electrically in series across said diode rectifier means;
means placing the midpoint of said series resistor circuit electrically in common with a point in circuit between said series connected controlled rectifier means;
fourth resistor means connected between said gate electrode of said first controlled rectifier means and said cathode thereof;
fifth resistor means connected between the gate electrode of said second controlled rectifier means and said common lead;
third capacitor means connected between said gate electrode of said first controlled rectifier and said common lead; and
diac means connected between the gate electrode of said second controlled rectifier to said capacitor of said voltage monitoring circuit.

2. Apparatus for starting and operating an arc discharge lamp having a starting peak voltage $V_1$ and a normal operating voltage $V_2$, where $V_1>V_2$, from a source of AC voltage having a half cycle time period of T seconds, comprising:
electrical ballast means for presenting an electrical impedance to AC voltage, said ballast means including:
a core of magnetic material;
at least one winding located on said core, said winding comprising a predetermined plurality of turns of insulated electrical wire between a first and second winding end; and
tap means on said winding located at a predetermined number of turns $N_T$ from said first winding end for dividing said winding into two winding portions, one portion being larger than the other portion, whereby the turns in said larger portion bears a ratio to the turns in said smaller portion, $N-N_T/N_T$, of greater than 1;
arc discharge lamp means having first and second terminals;
a circuit common of reference zero potential;
means for connecting said second winding end in circuit with said first lamp terminal and means for connecting said second lamp terminal in circuit with said circuit common to place said winding and lamp in a series current conducting circuit;
means for coupling AC voltages from an AC source into said one winding to provide an AC voltage $V_2$ at said second winding end when said lamp is in a current conducting state and an AC voltage, $V_3$, when said lamp is not in the current conducting state, where $V_1>V_3>V_2$, and to provide an AC voltage at said tap means;
first resistor means;
first capacitor means;
means connecting said first resistor means and said first capacitor means in electrical series circuit and means for connecting said electrical series circuit in circuit between said second winding end and said circuit common;
unidirectional current conducting semiconductor controlled rectifier means having a positive polarity anode, a negative polarity cathode, and a gate electrode and having the characteristic of normally being in a noncurrent conducting state until triggered by a proper voltage at said gate electrode and thereupon conducting current only in a direction from its anode to its cathode, regardless of the maintenance of the proper voltage at said gate electrode, until such current reduces to zero and thereupon restoring to its non-current conducting state;
unidirectional current diode rectifier means having a positive polarity terminal and a negative polarity terminal for conducting current therethrough only in a direction from its positive to negative terminals;
second capacitor means;
means connecting said second capacitor means and said semiconductor controlled rectifier means in a series current conducting circuit, including the anode and cathode thereof, and means locating said series circuit in circuit between said tap means and said circuit common;
means connecting said diode rectifier means in circuit across said controlled rectifier means and with said diode means being poled in a direction opposite in polarity to the polarity of the respective controlled rectifier terminals so that said rectifier means conducts current only in a direction opposite to the direction of current conducted by said controlled rectifier means;

diac semiconductor switch means responsive to a voltage of a predetermined level, $V_4$, across its terminals for switching from a noncurrent conducting state to a current conducting state;

second resistor means;

means connecting said diac means and said second resistor means electrically in a series circuit with one end of said diac connected in circuit between said first resistor and first capacitor and with one end of said second resistor connected to said circuit common; and means connecting the gate electrode of said controlled rectifier means electrically in circuit between said diac switch means and said second resistor means, whereby responsive to said first capacitor charging to a voltage level, $V_4$, said diac switches into a current conducting condition and applies a proper voltage from said capacitor to said gate electrode to trigger said controlled rectifier means into its current conducting state;

said first resistance means and said first capacitance means being sized such that at said AC voltage, $V_3$, applied to said first lamp terminal said first capacitor means is charged through said first resistor means to said voltage $V_4$ within a time period of less than one-half cycle of AC and more than one-eighth cycle of AC but insufficient to attain said voltage $V_4$ when the AC voltage at said first lamp terminal is of a level of $V_2$ or less.

3. The invention as defined in claim 2 wherein said means for coupling AC voltages from an AC source into said winding comprises:

first electrical lead means connected in circuit with said first winding end in said electrical series circuit for connection to one terminal of said AC voltage source;

second electrical lead means connected in circuit with said circuit common for connection to the second terminal of said AC voltage source wherein said AC source is placed in series with said winding.

4. The invention as defined in claim 2 wherein said means for coupling AC voltages from an AC voltage source into said winding comprises a primary winding located on said core adapted for coupling to said AC voltage source.

5. The invention as defined in claim 2 wherein said means for coupling AC voltages from an AC source into said winding comprises:

an auto-transformer having a primary winding and a secondary winding with said primary winding being adapted for connection to said AC voltage source, and wherein said secondary winding is connected in said electrical series circuit with said first winding end and the other end of said secondary winding is connected in circuit with said circuit common.

6. Apparatus for starting a gaseous discharge lamp having at least two electric terminals which form part of a current conducting circuit through said lamp from an alternating current source in combination with lamp ballast means for supplying operating voltages to said lamp, said lamp ballast means of the type which includes at least a winding, means for coupling said winding to said AC source, first electrical lead means for connection in circuit with one terminal of said lamp, second electrical lead means for connection in circuit with the other terminal of said lamp, and third electrical lead means coupled in circuit to said winding at a predetermined number of turns from an end thereof, comprising the combination of:

first resistor means;

first capacitor means;

means connecting said first resistor means and said first capacitor means in electrical series circuit and means for connecting said electrical series circuit in circuit between said first and second lead means;

semiconductor controlled rectifier means having a positive polarity anode, a negative polarity cathode, and a gate electrode, said controlled rectifier means having the characteristic of normally being in a noncurrent-conducting state until triggered by a proper voltage at said gate electrode and thereupon conducting current only in a direction from its anode to its cathode regardless of the continuance of said proper voltage at said gate electrode, and such current reduces to zero and thereupon restoring to its noncurrent-conducting state;

diode rectifier means having a positive polarity terminal and a negative polarity terminal for conducting current therethrough only in a direction from its positive to its negative terminals;

second capacitor means;

means connecting said second capacitor means and said semiconductor controlled rectifier means in a series current-conducting circuit, including the anode and cathode thereof and means for coupling said series circuit between said third lead means and one of said first lead means and second lead means;

means connecting said diode rectifier in circuit across said controlled rectifier means with said diode means being poled in a direction opposite in polarity to the polarity of the respective controlled rectifier means so that said rectifier means conducts current only in a direction opposite to the direction of current conducted by said controlled rectifier means;

diac semiconductor switch means responsive to a predetermined voltage across its terminals for switching from a noncurrent-conducting state to a current conducting state;

second resistor means;

means connecting said diac switch means and said second resistor means electrically in a series circuit with one end of said diac connected in circuit between said first resistor and said first capacitor for applying voltage on said capacitor to said diac switch means and with one end of said second resistor means connected in common with the cathode of said controlled rectifier means; and means connecting the gate electrode of said controlled rectifier means electrically in circuit between said diac means and said second resistor means.

7. The invention as defined in claim 6 further comprising:

a second semiconductor controlled rectifier means having a positive polarity anode, a negative polarity cathode and a gate electrode;

means connecting said second semiconductor controlled rectifier means in series circuit between said first semiconductor controlled rectifier means and said second capacitor means, and with said diode rectifier means connected across the series combination of both of said controlled rectifier means;

third and fourth resistor means of approximately equal resistance levels;

means connecting said third resistor means in circuit between the anode and cathode of said second controlled rectifier means and means connecting said fourth resistor means in circuit between the anode and cathode of said first resistor means;

fifth resistor means connected between said gate electrode of said second controlled rectifier means and said anode thereof;

third capacitor means connected between said gate electrode of said second controlled rectifier means and said anode of said first controlled rectifier means.

* * * * *

UNITED STATES PATENT OFFICE
CERTIFICATE OF CORRECTION

PATENT NO. : 3,889,152
DATED : June 10, 1975
INVENTOR(S) : Richard Hill Bodine, Jr. and Marion Rosiak It is certified that error appears in the above-identified patent and that said Letters Patent are hereby corrected as shown below:

In the Abstract, line 10, between the words "and" and "diode" insert -- a --. In Column 6, line 53, the word "test" should read -- text --. In Column 7, line 21, the word "conditions" should read -- condition --. In Column 8, line 27, the word "form" should read -- from --. In Column 8, line 65, the word "radius" should read -- radians --. In Column 10, line 5, the word "in" (first instance) should read -- the --. In Column 14, line 50 (Claim 2 of the patent) between the words "current" and "diode", insert -- conducting --.

Signed and Sealed this sixteenth Day of September 1975

[SEAL]

Attest:

RUTH C. MASON
*Attesting Officer*

C. MARSHALL DANN
*Commissioner of Patents and Trademarks*